April 29, 1924.

F. RENNER 1,492,536

CLUTCH

Filed May 10, 1921    2 Sheets-Sheet 1

FRANK RENNER.
INVENTOR

BY Victor J. Evans
ATTORNEY

April 29, 1924.

F. RENNER

CLUTCH

Filed May 10, 1921

FRANK RENNER, INVENTOR

BY Victor J. Evans ATTORNEY

Patented Apr. 29, 1924.

1,492,536

UNITED STATES PATENT OFFICE.

FRANK RENNER, OF CHICAGO, ILLINOIS.

CLUTCH.

Application filed May 10, 1921. Serial No. 468,327.

*To all whom it may concern:*

Be it known that I, FRANK RENNER, a citizen of the United States, residing at Chicago, in the county of Cook and State of Illinois, have invented new and useful Improvements in Clutches, of which the following is a specification.

This invention relates to clutches and an object of the invention is to provide a clutch particularly designed for use on motor vehicles or power plants analogous to the power plants of motor vehicles and an object of the invention is to provide a clutch structure which will prevent "grabbing" or the quick abrupt gripping of the clutch and the resulting unnecessary wear on the parts of the power plant and one which will provide a firm grip.

Another object of this invention is to provide a clutch structure embodying a cone formed of separate sections, the perimeters of which are of different angles one to the other, one of which sections co-operates with the grip ring carried by the fly wheel while the other co-operates with the thrust cone ring of the clutch structure to permit a steady movement during throwing in of the clutch as well as to permit a yielding during such operation.

Other objects of the invention will appear in the following detailed description and in the accompanying drawing wherein:

Fig. 4 is a fragmentary section taken on the line 4—4 of Fig. 1.

Figure 1:
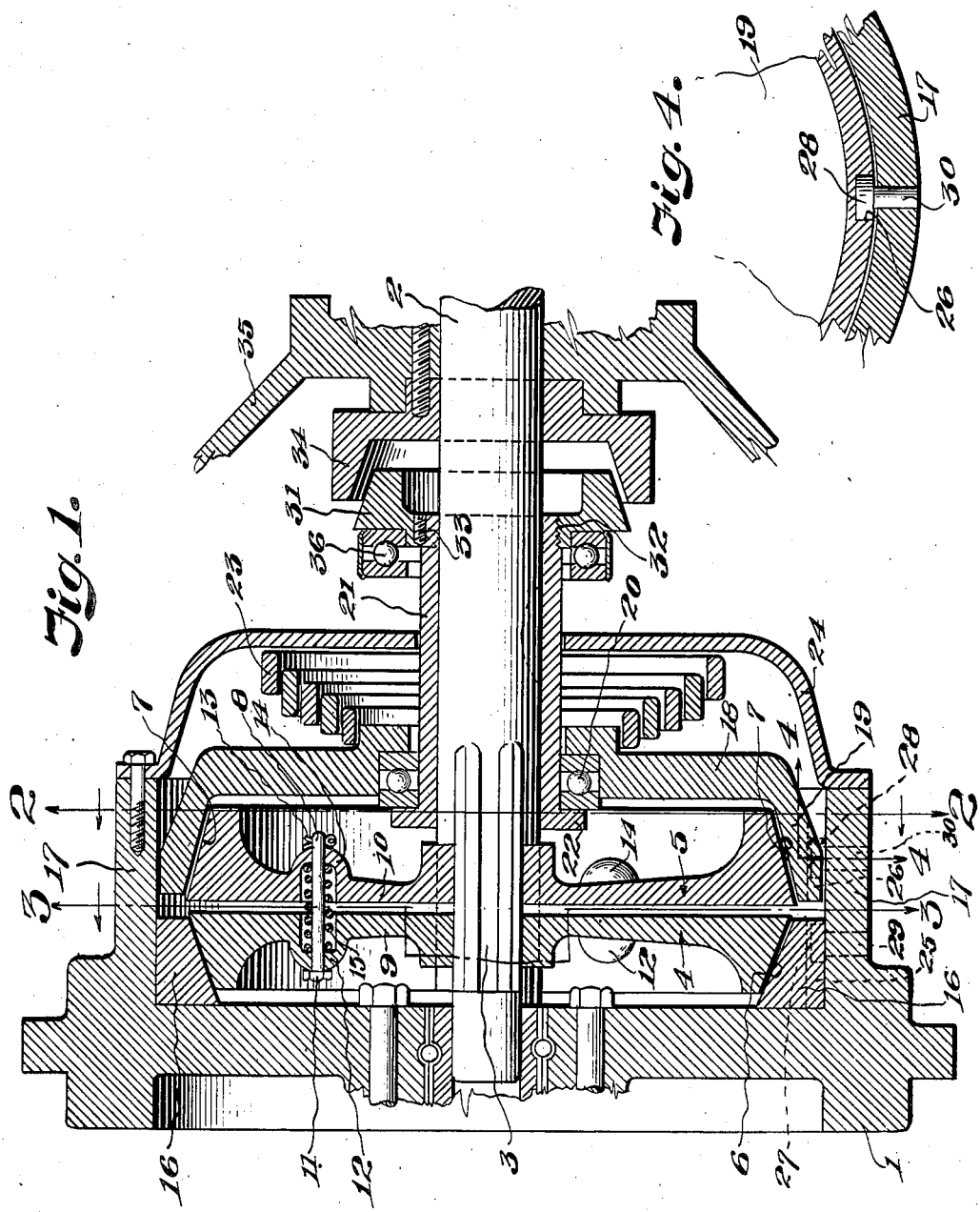
Fig. 1 is a longitudinal section through the improved clutch.
Figure 2:
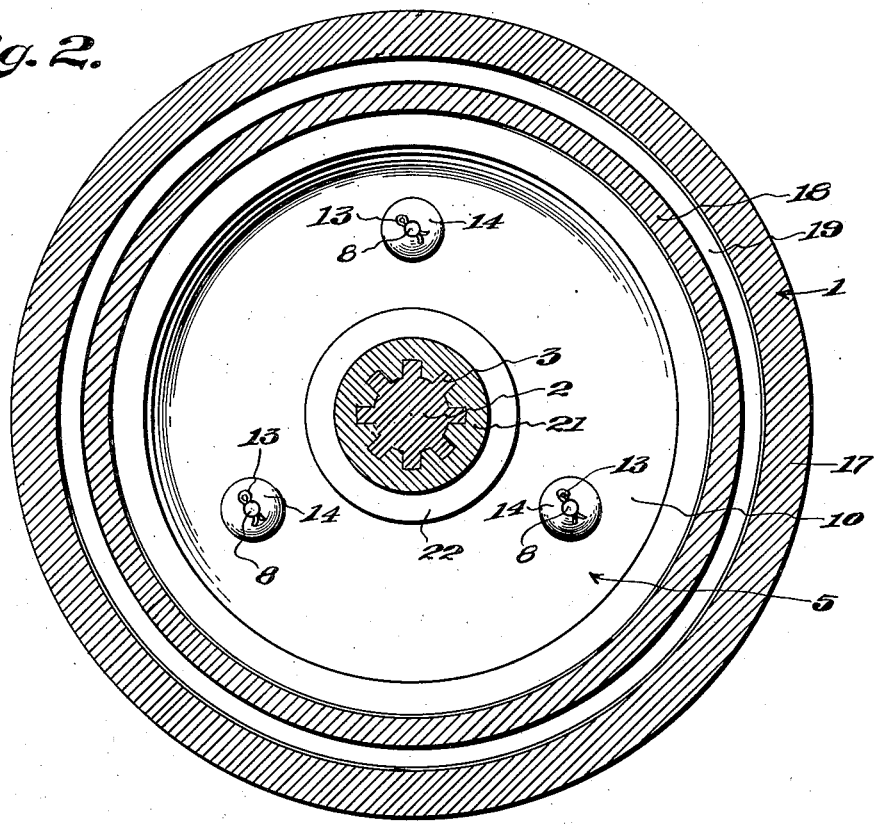
Fig. 2 is a section through the clutch taken on the line 2—2 of Fig. 1.
Figure 3:
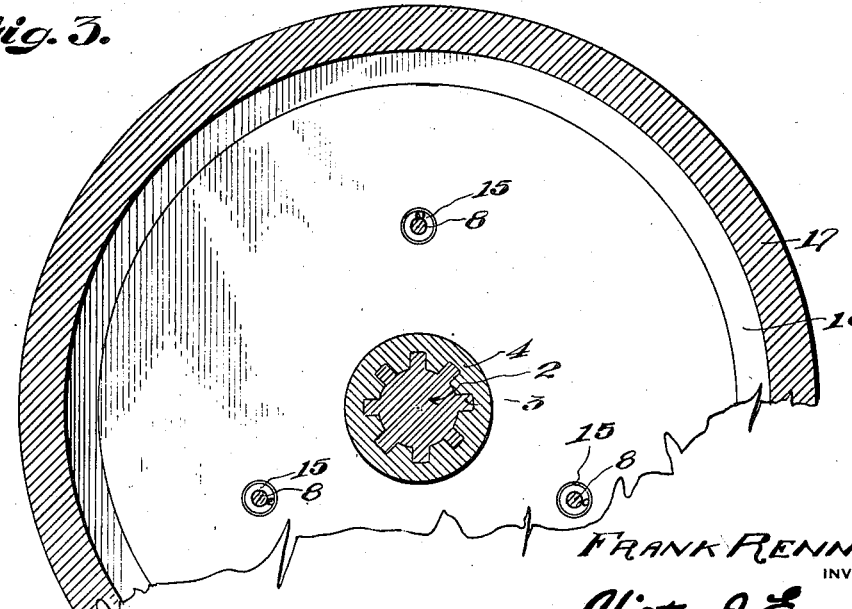
Fig. 3 is a cross section through the clutch taken on the line 3—3 of Fig. 1.

Referring more particularly to the drawing the improved clutch mechanism comprises the usual fly wheel 1 and clutch shaft 2, a portion of the clutch shaft being splined as shown at 3 and the cone sections 4 and 5 are mounted upon the splined portion 3 of the shaft 2. The cone section 4 has a beveled perimeter as shown at 6 which is beveled at a slightly greater degree than the beveled perimeter 7 of the cone section 5. The relation or proportion of these beveled perimeters one to the other is substantially 13 degrees for the perimeter 6, and eight degrees for the perimeter 7. The sections 4 and 5 are connected at circumferentially spaced points by bolts or pins 8 which extend transversely through the webs 9 and 10 respectively of the cone sections and which have heads 11 that engage against the outer surfaces of the spring housings 12 carried by the section 4 and cotter pins or analogous structures 13 are inserted through the opposite ends of the pins or bolts 8 and engage against the outer surfaces of the spring housings 14 carried by the web 10 of the cone section 5. Spiral springs 15 are coiled about the pins 8 and engage in the cored out recesses in the housings 12 and 14 respectively. The springs 15 are relatively weak, having tensile strength of substantially fifteen pounds and their tension is such as to normally hold the cone sections 4 and 5 in spaced relations and to permit yieldable movement of one section relative to the other. A cone ring 16 of aluminum or analogous material is positioned within the clutch casing 17 which is formed upon the fly wheel 1 and its inner perimeter is beveled to engage the perimeter 6 of the section 4. The thrust cone ring 18 is provided with an annular flange or rim portion 19, the inner perimeter of which is beveled to co-operate with the beveled perimeter 7 and the thrust cone ring 18 is mounted upon a thrust ball bearing 20 mounted upon the throwout sleeve 21. The throwout sleeve 21 is slidably mounted upon the shaft 2 and it has an annular collar or flange 22 on its inner end engaging the bearing 20 for moving the thrust cone ring 18 upon movement of the throwout sleeve 21. The usual thrust spring 23 is mounted within the cover casing 24 of the clutch structure which cover casing is attached to the outer edge of the clutch casing 17 in any suitable manner.

The cone ring 16 and the thrust cone ring 18 are provided with transversely extending recesses 25 and 26 respectively at spaced circumferential points and these transverse recesses receive the heads 27 and 28 respectively of pins 29 and 30 which are carried by the clutch casing 17 at circumferentially spaced points. The heads 27 and 28 engaging in the transverse recesses 25 and 26 prevent rotary movement of the cone ring 16 and thrust cone ring 18 relative to the fly wheel 1.

The throwout sleeve 21 has a brake cone 31 mounted upon its outer end, preferably by threaded connection as shown at 32 in Fig. 1 of the drawing and the locking set screw 33 is provided to prevent relative movement of the throwout sleeve 21 and brake cone 31. The brake cone 31 coacts with a cone shell 34 which is carried by the clutch housing 35 and the cone 31 and shell 34 co-act to brake the operation of the clutch, that is, to prevent spinning of the clutch sections when the clutch is thrown out. A thrust ball bearing 36 is provided which engages the brake cone 31 and takes the throwout pull.

It is, of course, to be understood that the invention may be constructed in various other manners and the parts associated in different relations and, therefore I do not desire to be limited in any manner except as set forth in the claims hereunto appended.

Having thus described my invention what I claim is:

1. In a clutch, a cone comprising a pair of circular sections having their perimeters beveled in opposite directions, one of said sections having its perimeter beveled at a greater degree than the other section, a thrust cone ring adapted for cooperation with the perimeter of one of said cone sections, and means yieldably connecting said cone sections and normally maintaining them in spaced relation.

2. In a clutch, the combination with a fly wheel, of a cone ring carried thereby, a cone comprising a pair of circular independently movable sections having their perimeters beveled in opposite directions, the perimeter of one of said sections being beveled at a greater degree than the other section and adapted to cooperate with said cone ring, a thrust cone ring adapted for cooperation with the perimeter of the other cone section, and yieldable means normally maintaining said cone sections in spaced relation.

3. A clutch mechanism including a shaft, a fly wheel, a clutch casing on the fly wheel, a cone ring in the casing, a movable sleeve on the shaft, a thrust cone ring movable with the sleeve, a cone comprising a pair of circular independently movable sections mounted upon the shaft within the clutch casing and having their perimeters beveled in opposite directions, the perimeter of one of said sections being beveled a greater degree than the other section and adapted to cooperate with the cone ring, and the other of said sections having its perimeter cooperating with the inner face of the thrust cone ring.

In testimony whereof I affix my signature.

FRANK RENNER.